Patented July 22, 1924.

1,502,455

UNITED STATES PATENT OFFICE.

WILLIAM H. WOOD, OF SOUTH EUCLID, OHIO.

STORAGE BATTERY.

No Drawing. Application filed July 1, 1921. Serial No. 481,981.

*To all whom it may concern:*

Be it known that I, WILLIAM H. WOOD, a citizen of the United States, residing at South Euclid, in the county of Cuyahoga and State of Ohio, have invented a certain new and useful Improvement in Storage Batteries, of which the following is a full, clear, and exact description.

This invention relates to storage batteries and has for its general object the provision of essential members which shall possess sufficient penetrability to the electric and chemical action for efficient operation together with a high degree of resistance to the corrosive action of the electrolyte and the disrupting tendency of the processes involved. The type of battery to which I especially refer is the lead oxide cell in which the plates consist of metallic frames or grids filled with lead compounds and immersed in dilute sulphuric acid, although some features of my improvements are applicable to other types of battery and even to other electrolytic apparatus and I claim and desire to secure the same for every use to which they may be applicable.

In addition to the container and electrolyte such a cell contains three essential members, a positive plate, a negative plate, and a separator. The positive and negative plates are generally made in a number of sections interspersed together and connected in parallel, but this is merely for compactness; they are generally located just as close together as possible to decrease the internal resistance and separators are employed to prevent accidental contact between the plates by reason of buckling and loosening of the active material or by the formation of dendritic metallic growths under the influence of the current. These separators are necessarily of a nature to permit the passage of the electric current and this with the least possible obstruction compatible with the prevention of metallic contact. Perforated sheets of rubber or the like are used in some batteries, particularly those wherein the rate of discharge is slow and uniform; but in the case of a battery of high discharge rate such as is used in automobile-starters, the tendency toward dendritic growths is such as to necessitate the restriction of the openings to capillary size through which the metal particles cannot penetrate. Accordingly the separators have generally been made of an organized, pervious, cellulose material, either in the form of thin sheets of wood or of wicks of cellulose contained in sheets of insoluble supporting material such as rubber. These offer the disadvantage of slowly becoming dissolved by the acid if kept submerged and rapidly becoming carbonized and destroyed if exposed to the air by evaporation of the electrolyte.

Also the active plates heretofore used have been active only on the surface, the density of the lead compounds being such as to preclude interior reaction. This has led to a construction of plates having a maximum of surface area and a minimum of thickness, which has aggravated the tendency toward warping. In an attempt to afford access of electrolyte to the interior of the plates so as to enable chemical and electrical action to take place throughout the entire depth of the material it has been suggested to mix the lead compounds with cellulose containing material, such as sawdust, but this has the disadvantage of solubility, carbonization, etc. which weakens the plate, added to which is the fact that the carbon is an electrically active material.

The problem is essentially the same in both the active plates and the separators, namely to afford penetrability to the electrolyte without solubility in the same; and the gist of my invention consists in forming such battery elements with wicks or capillaries of organized, porous keratin when used in the lead substance of the plates. This has the effect of opening the interior portions to the electrical and chemical action, and when used in the separators it has the effect of permitting free ionic travel, but without possibility of solution. And besides when used in the plates it enables the same to be made thicker by reason of the fact that the interior portions become active, and also permits the use of separators of a more pervious nature since the increased surface opened to electric action decreases the tendency to throw out excrescences of conducting material.

Keratin is the substance which composes the epidermoid outgrowths of vertebrate animals, namely, the hair, hoofs, horns, and nails of mammals, the feathers of birds, and the scales of fishes. This keratin occurs both in an organized, porous, condition and in a horny, impervious condition, the two conditions always accompanying each other. Thus the interior or core of hair, wool, c feathers and the base portions of horns, hoofs, and fish scales, are of such an organized, porous structure as to convey nourishment; while the outer parts exhibit an imperious, horny, protective condition. Thus in wool, hair, or feathers, the exterior parts are covered with overlapping scales which are very minute in the case of wool and comparatively large in the case of feathers. In the case of fishes the scaly part is greatly increased proportionately as is also true in the nails, horns, and hoofs of mammals.

In order to prepare this material for the purpose in view, I first remove or loosen the unorganized or horny portions by means of an aklaline or alkali sulphite solution, preferably sodium sulphite; which dissolves the horny portions at least as easily as it does the porous and organized portions. I preferably employ a form of raw material in which the organized portion bears the largest possible relation to the unorganized portion, namely wool, hair or feathers; all of which possess a fibrous character which serves to bind the active material together coupled with a springy elastic nature which allows the entire mass to expand and contract without disruption. The chemical treatment to loosen the scales must be arrested before the fiber itself is destroyed and may be arrested before the scales are completely removed, provided only that enough are loosened to afford ready ingress and egress to the liquid and to enable the active material to adhere to the fibre. For example, an immersion for one hour in a solution of one part sodium sulphite to thirty parts of water is excellent for wool and hair while an immersion for much less time or in a considerably weaker solution is sufficient in the case of feathers. The progress of the descaling can readily be ascertained by the microscope.

The organized substance is then comminuted, if necessary, although I prefer to retain sufficient length to secure a good binding action, say ⅛ to ¼ inch. In the case of fine feathers no shortening is necessary, although considerable care is required in descaling since the fine organized substance dissolves very quickly upon overtreatment.

The use of this material is most beneficial in the positive plate since this is the more liable to crumble and buckle, and is also more active by nature than the negative plate. When used in separators it may either be woven, knitted, or netted, either by itself or in company with other strands; or it may be arranged in the form of wicks penetrating a plate of impervious material. In the case of separators indeed, the fabric may first be woven out of wool or hair and the descaling effected subsequently although I prefer to employ slaughter house hair or feathers which are now waste products and remove the scales prior to fabrication which is thereby facilitated. In the case of separators of the wick type the hairs need not always be descaled provided only that they are arranged with their axes parallel to the length of the wick.

The preferred type of separator consists of a fabric woven from twisted strands of descaled hair and stiffened by strips of insoluble material such as rubber or stretched upon an insoluble framework; or constituting wicks traversing an otherwise impervious plate.

It will be understood that the different elements of my improved battery may be used separately if desired and that any battery utilizes my invention which employs any one or more of the same. It will also be understood that I do not restrict myself to any of the details of construction or manipulation herein described except as the same are specifically recited in the annxed claims.

Having thus described my invention what I claim is:

1. A storage battery separator composed of a binding material and minute wicks of comminuted birds' feathers extending from side to side through the separator.

2. A separator for storage batteries formed of nonporous supporting material and strands or wick of porous keratin penetrating the same.

3. A storage battery separator composed of porous animal material extending from side to side through the separator and a supporting substance for holding the same in place.

4. An acid-resistant, electrolytic diaphragm made essentially of the fibrous epidermal covering of terrestrial vertebrate animals, the external scales of such fibrous covering having been loosened.

5. An acid-resistant, electrolytic diaphragm consisting of a supporting structure of impervious insoluble material, having apertures therein which are filled with organized porous keratin.

6. A flexible acid-resistant septum for acid liquids made essentially of keratin from which the non-porous part has been removed in combination with a non-porous supporting structure whereby it is held in plate form.

7. A storage battery separator consisting essentially of bird's feathers.

8. A storage battery separator characterized by having its pervious portions of organized keratin.

9. A storage battery comprising active elements and separators between said elements consisting essentialy of bird's feathers.

In testimony whereof, I hereunto affix my signature.

WILLIAM H. WOOD.